United States Patent
Yun et al.

(10) Patent No.: US 11,942,800 B2
(45) Date of Patent: Mar. 26, 2024

(54) METHOD FOR WIRELESS POWER TRANSFER AND ELECTRONIC DEVICE THEREOF

(71) Applicant: Samsung Electronics Co., Ltd., Suwon-si (KR)

(72) Inventors: Yongsang Yun, Suwon-si (KR); Chihyun Cho, Suwon-si (KR); Yusu Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 469 days.

(21) Appl. No.: 17/284,625

(22) PCT Filed: Oct. 8, 2019

(86) PCT No.: PCT/KR2019/013159
§ 371 (c)(1),
(2) Date: Apr. 12, 2021

(87) PCT Pub. No.: WO2020/076042
PCT Pub. Date: Apr. 16, 2020

(65) Prior Publication Data
US 2021/0399590 A1 Dec. 23, 2021

(30) Foreign Application Priority Data
Oct. 12, 2018 (KR) ........................ 10-2018-0121481

(51) Int. Cl.
*H02J 7/00* (2006.01)
*H02J 50/10* (2016.01)
*H02J 50/80* (2016.01)

(52) U.S. Cl.
CPC .......... *H02J 50/80* (2016.02); *H02J 7/00045* (2020.01); *H02J 50/10* (2016.02); *H02J 7/00034* (2020.01); *H02J 2310/22* (2020.01)

(58) Field of Classification Search
CPC ...................................................... H02J 50/10
(Continued)

(56) References Cited

U.S. PATENT DOCUMENTS

| 5,341,083 A * | 8/1994 | Klontz ................ H02J 7/0042 |
| | | 320/109 |
| 8,698,450 B2 | 4/2014 | Yeh |

(Continued)

FOREIGN PATENT DOCUMENTS

| KR | 10-2014-0139348 A | 12/2014 |
| KR | 10-2016-0077695 A | 7/2016 |

(Continued)

OTHER PUBLICATIONS

Korean Notice of Patent Grant dated Nov. 8, 2023, issued in Korean Patent Application No. 110-2018-0121481.
(Continued)

*Primary Examiner* — Yalkew Fantu
(74) *Attorney, Agent, or Firm* — Jefferson IP Law, LLP

(57) ABSTRACT

Various embodiments of the present invention relate to wireless power transfer (WPT). An electronic device comprises a battery, a charging circuit for controlling a charging state of the battery, a coil, a wireless power transfer circuit electrically connected to the coil, and a control circuit, wherein the control circuit may be configured to: check a state related to charging of the battery; transfer a wireless charging parameter related to generation or modification of a power signal for transferring to an external electronic device via the coil, which is determined at least on the basis of the state related to charging of the battery; receive a response signal corresponding to the transfer of the wireless charging parameter from the external electronic device; generate, on the basis of the response signal, a power signal corresponding to the amount of wireless transmission power (Continued)

determined at least on the basis of the response signal by using the wireless power transfer circuit; and transfer the power signal to the external electronic device through the coil. In addition, various embodiments are possible.

15 Claims, 13 Drawing Sheets

(58) Field of Classification Search
USPC .......................................................... 320/108
See application file for complete search history.

(56) References Cited

U.S. PATENT DOCUMENTS

| | | | |
|---|---|---|---|
| 9,160,204 | B2 | 10/2015 | Yeh |
| 9,225,193 | B2 | 12/2015 | Yeh |
| 9,577,463 | B2 | 2/2017 | McCoy et al. |
| 10,361,580 | B2 | 7/2019 | Cha |
| 2014/0111153 | A1* | 4/2014 | Kwon ..................... H02J 50/40 320/108 |
| 2014/0203769 | A1* | 7/2014 | Keeling .................. B60L 53/38 320/108 |
| 2014/0347008 | A1 | 11/2014 | Chae et al. |
| 2015/0180284 | A1* | 6/2015 | Kang ...................... H02J 50/80 307/104 |
| 2018/0138749 | A1 | 5/2018 | Lee et al. |
| 2019/0052100 | A1 | 2/2019 | Lim et al. |

FOREIGN PATENT DOCUMENTS

| | | |
|---|---|---|
| KR | 10-2017-0005687 A | 1/2017 |
| KR | 10-2017-0067050 A | 6/2017 |
| KR | 10-2018-0057069 A | 5/2018 |
| WO | 2011-011755 A1 | 1/2011 |
| WO | 2016-182208 A1 | 11/2016 |

OTHER PUBLICATIONS

Korean Office Action dated Aug. 30, 2023, issued in Korean Patent Application No. 10-2018-0121481.
Korean Office Action with English translation dated Apr. 14, 2023; Korean Appln. No. 10-2018-0121481.

* cited by examiner

METHOD FOR WIRELESS POWER TRANSFER AND ELECTRONIC DEVICE THEREOF

TECHNICAL FIELD

Various embodiments of the disclosure relate to a wireless power transfer method and an electronic device therefor.

BACKGROUND ART

Electronic devices, such as a smailphone, which are widely used, use a battery-type power source for portability. A battery may be fixedly or detachably installed in an electronic device and may be charged using an external power source. For convenience of charging, a wireless charging function using an electromagnetic field is supported in addition to charging using a wired connector, such as an adapter. Generally, wireless charging is a function provided by a dedicated charging deck. Recently, a wireless charging function has been implemented in an electronic device, such as a smartphone.

DISCLOSURE OF INVENTION

Technical Problem

An electronic device having a unique function, such as a smailphone, may provide a wireless charging function for another device. In this case, a battery of the electronic device may be employed as a power source. However, since power is consumed for wireless charging of the other device, the battery of the electronic device cannot be charged or may be discharged, thereby reducing the usable time of the electronic device.

Various embodiments of the disclosure provide a method for wireless power transfer (WPT) to another device and an electronic device therefor.

Solution to Problem

According to various embodiments of the disclosure, an electronic device may include: a battery; a charging circuit configured to control a charging state of the battery; a coil; a wireless power transfer circuit configured to be electrically connected to the coil; and a control circuit, wherein the control circuit may be configured to: identify a state related to charging of the battery; transmit a wireless charging parameter related to generation or modification of a power signal to be transmitted to an external electronic device through the coil, the wireless charging parameter being determined at least based on the state related to charging of the battery; receive a response signal corresponding to transmission of the wireless charging parameter from the external electronic device; generate, based on the response signal, a power signal corresponding to an amount of wireless transmission power determined at least based on the response signal using the wireless power transfer circuit; and transmit the power signal to the external electronic device through the coil.

According to various embodiments of the disclosure, an electronic device may include: a connector configured to connect to external power; a battery; a charging circuit configured to control a charging state of the battery; a coil; a wireless power transfer circuit configured to be electrically connected to the coil; and a control circuit, wherein the control circuit may be configured to: charge the battery with the external power input through the connector using the charging circuit and to transmit a first power signal, which is generated using the wireless power transfer circuit, to an external electronic device through the coil; identify a state related to charging of the battery; transmit a wireless charging parameter determined at least based on the state related to charging of the battery to the external electronic device through the coil; receive a response signal corresponding to transmission of the wireless charging parameter from the external electronic device; transmit, based on the response signal, a second power signal to the external electronic device using the wireless power transfer circuit.

According to various embodiments of the disclosure, an operating method of an electronic device may include: identifying a battery level or a charging state; transmitting a wireless charging parameter related to generation or modification of a power signal to be transmitted to an external electronic device through a coil when the battery level or the charging state satisfies a specified condition; receiving a response signal to the transmitted wireless charging parameter from the external electronic device; and generating, based on the response signal, a power signal transmitted through the coil.

ADVANTAGEOUS EFFECTS OF INVENTION

A method and an electronic device therefor according to various embodiments may adjust the amount of power provided for charging in view of the states of the electronic device and another electronic device, thereby effectively performing the operation and charging of the electronic device and wireless charging of the other electronic device.

BEST MODE FOR CARRYING OUT THE INVENTION

Hereinafter, various embodiments will be described in detail with reference to the accompanying drawings.

Figure 1:
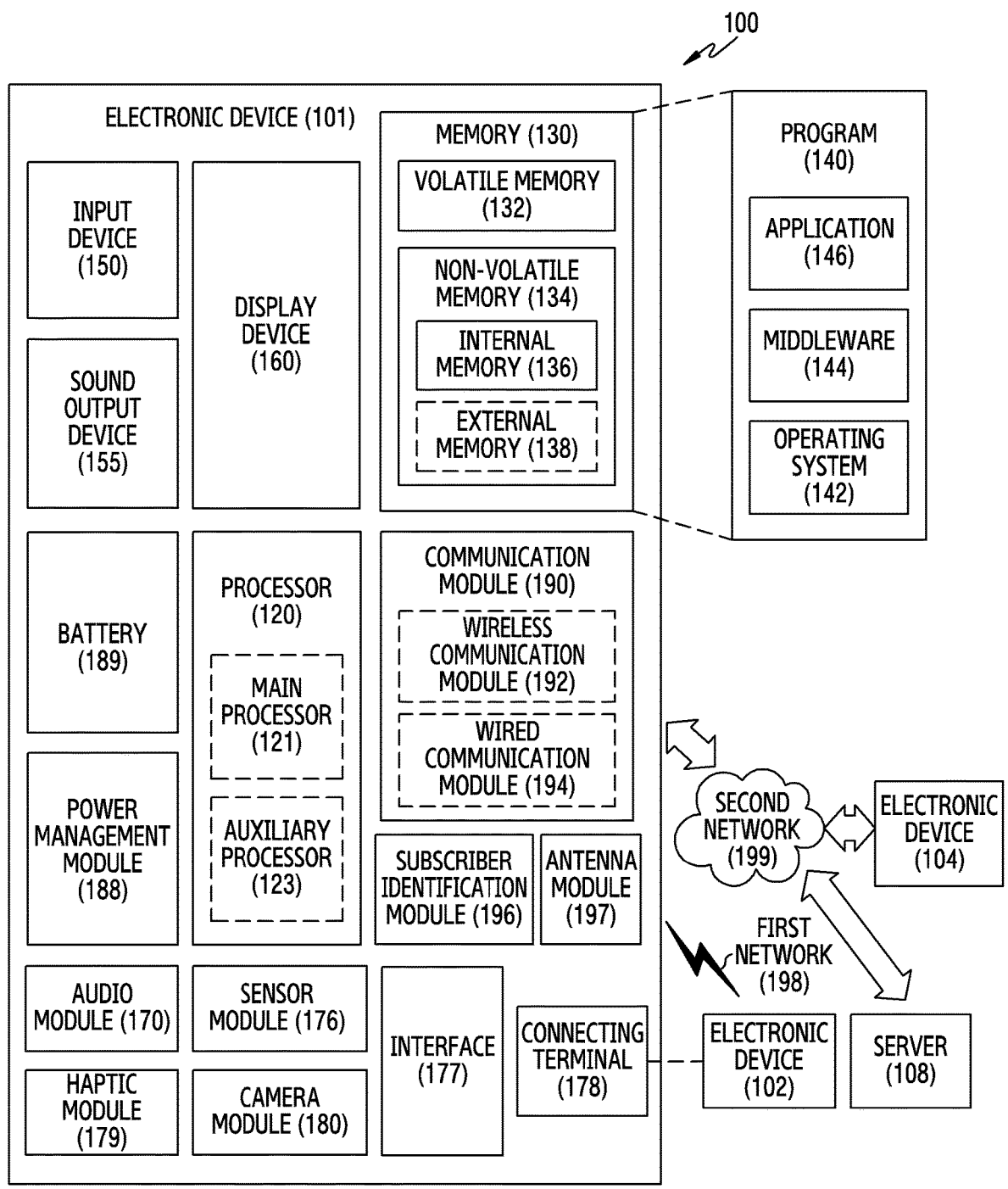
FIG. 1 is a block diagram of an electronic device in a network environment according to various embodiments of the disclosure.

FIG. 1 is a block diagram of an electronic device in a network environment according to various embodiments of the disclosure. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module(SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
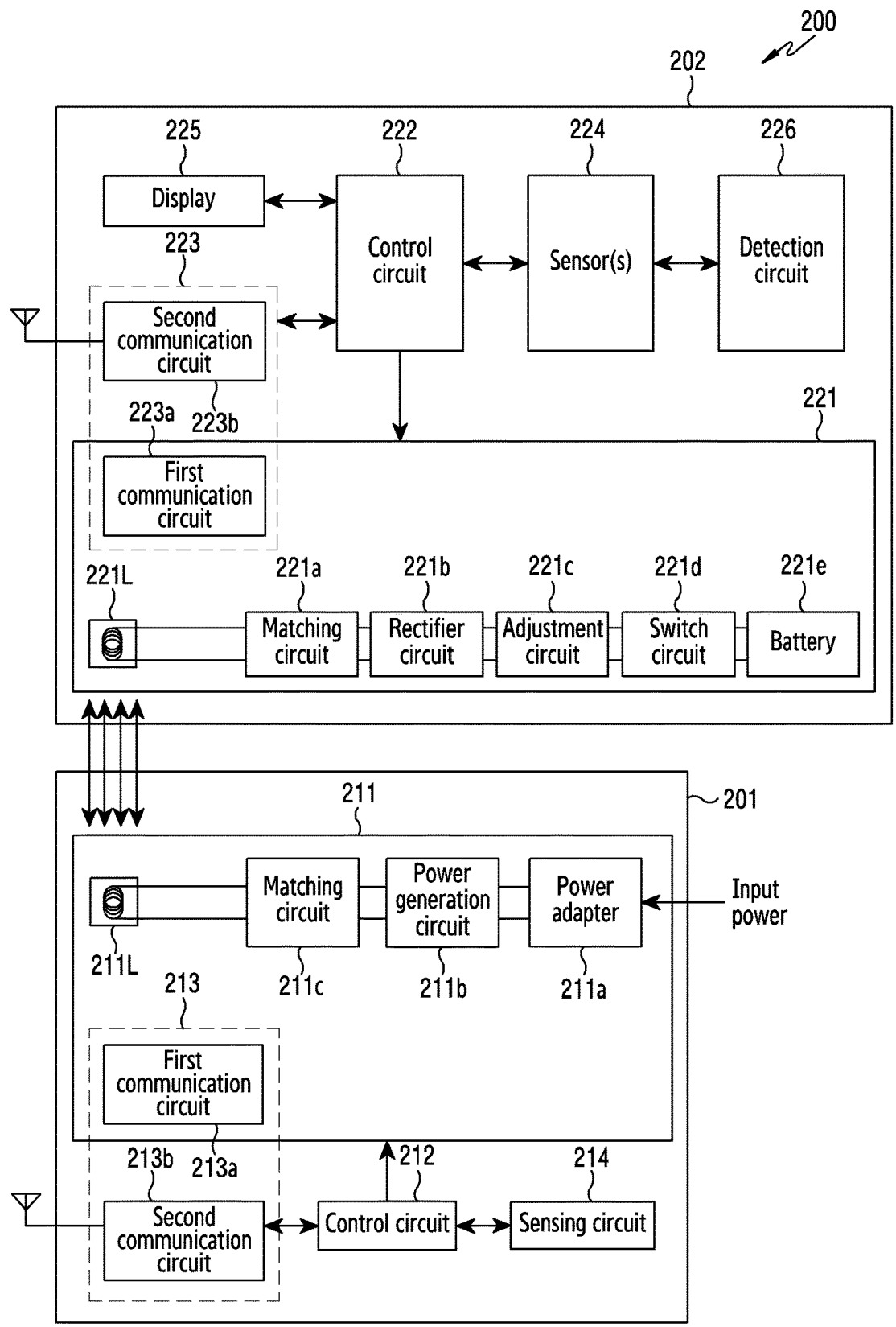
FIG. 2 illustrates a wireless charging environment according to various embodiments.

FIG. 2 illustrates a wireless charging environment 200 according to various embodiments. Referring to FIG. 2, an electronic device 201 (e.g., the electronic device 101 of FIG. 1) (hereinafter, also referred to as a power transfer device) according to various embodiments may wirelessly supply power to an external electronic device 202 (e.g., the electronic device 102 of FIG. 1) (hereinafter, also referred to as a power reception device), and the external electronic device 202 may wirelessly receive the power. The electronic device 201 may be an electronic device operating in a power transfer mode.

According to various embodiments, the power transfer device 201 may include a power transfer circuit 211, a control circuit 212, a communication circuit 213, or a sensing circuit 214.

According to various embodiments, the power transfer circuit 211 may include a power adapter 211a to receive power (or electricity) from the outside and to appropriately convert the voltage of the received power, a power generation circuit 211b to generate power, or a matching circuit 211c to maximize efficiency between a transfer coil 211L and a reception coil 221L.

According to various embodiments, the power transfer circuit 211 may include a plurality of pieces of at least some of the power adapter 211a, the power generation circuit 211b, the transfer coil 211L, or the matching circuit 211c in order to transfer power to a plurality of power reception devices (e.g., a first external electronic device and a second external electronic device).

According to various embodiments, the power transfer circuit 211 may generate a first signal of a first frequency for providing first power to the first external electronic device and a second signal of a second frequency for providing second power to the second external electronic device using the power generation circuit 211b. The first signal of the first frequency and the second signal of the second frequency may be generated when the transfer coil 211L has a multi-coil structure.

According to various embodiments, the control circuit 212 may perform overall control of the power transfer device 201, may generate various messages required for wireless power transfer, and may transmit the messages to the communication circuit 213. In an embodiment, the control circuit 212 may calculate power (or the amount of power) to be transmitted to the power reception device 202 based on information received from the communication circuit 213. In an embodiment, the control circuit 212 may control the power transfer circuit 211 so that power generated by the transfer coil 211L is transferred to the power reception device 202.

According to various embodiments, when power is transferred to each of a plurality of power reception devices (e.g., a first external electronic device and a second external electronic device), the control circuit 212 may control the power generation circuit 211b to generate a first signal of a first frequency for providing first power to the first external electronic device and a second signal of a second frequency for providing second power to the second external electronic device. To this end, the transfer coil 211L may have a multi-coil structure.

According to various embodiments, the communication circuit 213 may include at least one of a first communication circuit 213a or a second communication circuit 213b. The first communication circuit 213a may communicate with a first communication circuit 223a of the power reception device 202 using, for example, a frequency equal to or adjacent to a frequency used by the transfer coil 211L for power transfer.

The first communication circuit 213a may communicate with the first communication circuit 223a using the transfer coil 211L. Data (or communication signal) generated by the first communication circuit 213a may be transmitted using the transfer coil 211L. The first communication circuit 213a may transmit the data to the power reception device 202 using a frequency-shift keying (FSK) modulation scheme. According to various embodiments, the first communication circuit 213a may communicate with the first communication circuit 223a of the power reception device 202 by changing the frequency of a power signal transmitted through the transfer coil 211L. Alternatively, the first communication circuit 213a may communicate with the first communication circuit 223a of the power reception device 202 by including the data or communication signal in a power signal generated by the power generation circuit 211b. For example, the first communication circuit 213a may express the data by increasing or decreasing the frequency of a power transfer signal.

The second communication circuit 213b may communicate with a second communication circuit 223b of the power reception device 202 using, for example, a frequency different from the frequency used by the transfer coil 211L for power transfer (e.g., an out-of-band method). For example, the second communication circuit 213b may obtain information related to a charging state (e.g., a post-rectifier voltage value, a rectified voltage value (e.g. Vrec), information, information about a current flowing in a coil or a rectifier circuit (e.g. Tout), various packets, various messages, or the like) from the second communication circuit 223b using any one of various short-range communication methods, such as Bluetooth, Bluetooth Low Energy (BLE), Wi-Fi, and near-field communication (NFC).

According to various embodiments, the sensing circuit 214 may include at least one sensor and may detect at least one state of the power transfer device 202 using the at least one sensor.

According to various embodiments, the sensing circuit 214 may include at least one of a temperature sensor, a motion sensor, or a current (or voltage) sensor, may detect a temperature state of the power transfer device 201 using the temperature sensor, may detect a movement state of the power transfer device 201 using the motion sensor, and may detect the state of an output signal from the power transfer device 201, for example, a current level, a voltage level, or a power level, using the current (or voltage) sensor.

According to an embodiment, the current (or voltage) sensor may measure a signal in the power transfer circuit 211. The current (or voltage) sensor may measure a signal in at least a portion of the coil 211L, the matching circuit 211c, or the power generation circuit 211b. For example, the current (or voltage) sensor may include a circuit to measure a signal at a front end of the coil 211L.

According to various embodiments, the sensing circuit 214 may be a circuit for foreign object detection (FOD).

According to various embodiments, the power reception device 202 (e.g., 101 in FIG. 1) may include a power reception circuit 221 (e.g., the power management module 188), a control circuit 222 (e.g., the processor 120), a communication circuit 223 (e.g., the communication module 190), at least one sensor 224 (e.g., the sensor module 176), a display 225 (e.g., the display device 160), and a detection circuit 226. A description of components of the power reception device 202 corresponding to those of the power transfer device 201 may be partially omitted.

According to various embodiments, the power reception circuit 221 may include the reception coil 221L to wirelessly receive power from the power transfer device 201, a matching circuit 221a, and a rectifier circuit 221b to rectify received AC power into a DC, an adjustment circuit 221c to adjust a charging voltage, a switch circuit 221d, or a battery 221e (e.g., the battery 189).

According to various embodiments, the control circuit 222 may perform overall control of the power reception device 202, may generate various messages required for wireless power transfer, and may transmit the messages to the communication circuit 223.

According to various embodiments, the communication circuit 223 may include at least one of the first communication circuit 223a or the second communication circuit 223*b*. The first communication circuit 223*a* may communicate with the power transfer device 201 through the reception coil 221L.

The first communication circuit 223*a* may communicate with the first communication circuit 213*a* using the reception coil 221L. Data (or communication signal) generated by the first communication circuit 223*a* may be transmitted using the reception coil 221L. The first communication circuit 223*a* may transmit the data to the power transfer device 201 using an amplitude-shift keying (ASK) modulation scheme. The second communication circuit 223*b* may communicate with the power transfer device 201 using any one of various short-range communication methods, such as Bluetooth, BLE, Wi-Fi, and NFC.

According to various embodiments, the at least one sensor 224 may include at least some of a current/voltage sensor, a temperature sensor, an illuminance sensor, or a sound sensor.

According to various embodiments, the display 225 may display various types of display information required for wireless power transfer/reception.

According to various embodiments, the detection circuit 226 may detect the power transfer device 201 by detecting a search signal or received power from the power transfer device 201. The detection circuit 226 may detect a signal change at input/output terminals of the coil 221L, the matching circuit 221*a*, or the rectifier circuit 22 lb due to a signal of the coil 221L generated by a signal output from the power transfer device 201. According to various embodiments, the detection circuit 226 may be included in the reception circuit 221.

Figure 3:
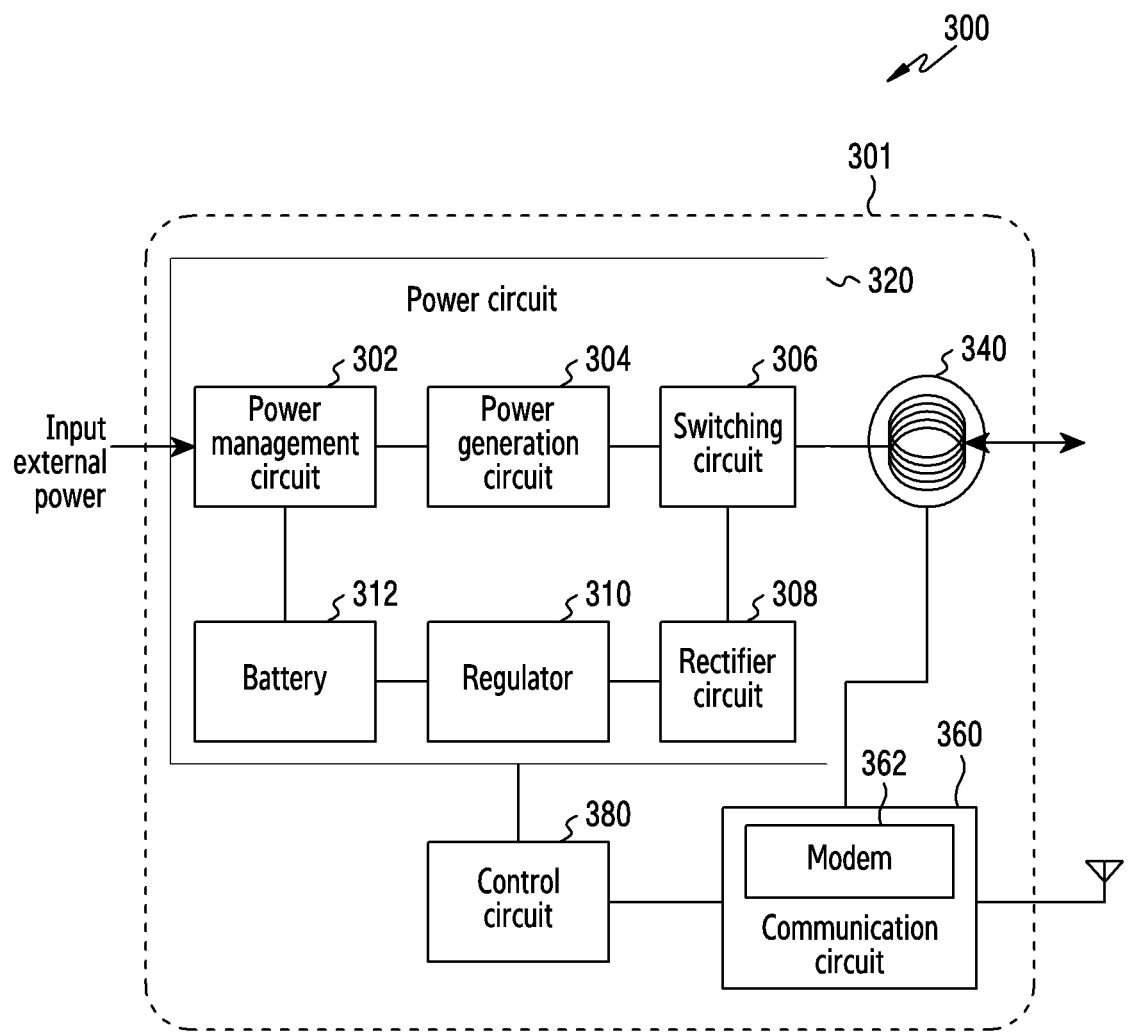
FIG. 3 is a block diagram of an electronic device having a power transfer function and a power reception function for wireless charging according to various embodiments.

FIG. 3 is a block diagram 300 of an electronic device 301 having a power transfer function and a power reception function for wireless charging according to various embodiments. The electronic device 301 (e.g., the electronic device 101 of FIG. 1) according to various embodiments may wirelessly supply power to a different device (e.g., the electronic device 102 of FIG. 1) or may wirelessly receive power from the different device.

Referring to FIG. 3, the electronic device 301 may include a power circuit 320, a coil 340, a communication circuit 360, or a control circuit 380.

The power circuit 320 may be a circuit to generate a wireless charging signal using external power input from the outside or a battery or to perform a battery charging operation using a received wireless charging signal provided from the coil 340. The control circuit 380 may control the power circuit 320. The power circuit 320 may be part of a circuit used to generate wireless power. The power circuit 320 may include, for example, a power management circuit 302 (e.g., the power management module 188 of FIG. 1), a power generation circuit 304, a switching circuit 306, a rectifier circuit 308, a regulator 310, or a battery 312 (e.g., the battery 189 of FIG. 1). Here, at least one of the power generation circuit 304, the switching circuit 306, the rectifier circuit 308, the regulator 310, or the communication circuit 360 may be configured as one integrated circuit (IC).

The power management circuit 302 may manage external power input from the outside. The power management circuit 302 may provide power input from the outside to at least one of the battery 312 or the power generation circuit 304. For example, the power management circuit 302 may provide some of the power input from the outside to the battery 312 and the rest to the power generation circuit 304.

The power generation circuit 304 may generate a signal for wireless charging of a different electronic device (e.g., the electronic device 102) using power provided from the power management circuit 302. For example, the signal may include a magnetic field signal or an RF signal. The power generation circuit 304 may generate a signal of a specific frequency for providing power to the different electronic device. For example, the power generation circuit 304 may generate at least one wireless power signal in a band of about 110 kHz to 205 kHz.

The switching circuit 306 may adjust a connection relationship between the coil 340 and another component (e.g., the power generation circuit 304 or the rectifier circuit 308) depending on whether the electronic device 301 transmits or receives a charging signal. For example, when the electronic device 301 transmits a charging signal, the switching circuit 306 may activate a path between the coil 340 and the power generation circuit 304. In another example, when the electronic device 301 receives a charging signal, the switching circuit 306 may activate a path between the coil 340 and the rectifier circuit 308.

The rectifier circuit 308 may rectify a current corresponding to a charging signal generated by the coil 340. For example, the rectifier circuit 308 may convert an AC signal into a DC signal. To this end, the rectifier circuit 308 may include at least one diode.

The regulator 310 may convert a DC signal generated by the rectifier circuit 308 into a signal having a specific level. For example, the regulator 310 may output a signal having a voltage level required for charging the battery 312.

The battery 312 may supply power required for the operation of the electronic device 302. The battery 312 may supply power required for the operation of the power generation circuit 304. The battery 312 may be charged with external power provided from the power management circuit 302 or may be charged with a signal corresponding to a charging signal of the different electronic device provided from the regulator 310.

The coil 340 may radiate a wireless power signal to the different electronic device, may receive a wireless power signal from the different electronic device, or may detect a ping signal. For example, the coil 340 may generate a magnetic field corresponding to a signal generated by the power generation circuit 304. In another example, the coil 340 may generate a current corresponding to a wireless power signal from the different electronic device.

The communication circuit 360 may communicate with the different electronic device. For example, the communication circuit 360 may transmit or receive information related to a charging state. When the electronic device 301 operates in a wireless power reception mode, the information related to the charging state may include transmission signal (power, frequency, voltage, or current) change request information, information about a state (power, voltage, or current) by a received signal, or transmission mode (power, voltage, or current) information. When the electronic device 301 operates in a wireless power transfer mode, the information related to the charging state may include transmission mode (power, voltage, or current) information or signal output state information (frequency, power, voltage, or current). To this end, the communication circuit 360 may include a modem 362 to modulate or demodulate a signal. A signal modulated by the communication circuit 360 may be transmitted through the coil 340. Alternatively, the signal modulated by the communication circuit 360 may be transmitted through a separate antenna.

The control circuit 380 may perform overall control of the electronic device 301. For example, the control circuit 380 may generate or interpret a message required for wireless power transfer or wireless power reception. In another example, the control circuit 380 may monitor a state related to charging of the electronic device 301. According to an embodiment, the control circuit 380 may determine the amount of power to be provided to the different electronic device based on information received through the communication circuit 360 or the monitored state. The control circuit 380 may be understood as part of the processor 120 of the electronic device 101 of FIG. 1.

The control circuit 380 may determine whether the operation mode of the electronic device 301 is a power transfer mode or a power reception mode and may control the power circuit 320. The control circuit 380 may identify the operation mode based on whether external power is input, a user input, or the state of the electronic device 301. When the operation mode is the power transfer mode, the control circuit 380 may control the power management circuit 302 and the power generation circuit 304 to generate a wireless charging signal and may control the switching circuit 306 to transmit the wireless charging signal to the coil 340. When the operation mode is the power reception mode, the control circuit 380 may control the switching circuit 306 to transmit a wireless charging signal received through the coil 340 to the rectifier circuit 308 and may control a rectifying operation of the rectifier circuit 308.

Figure 4:
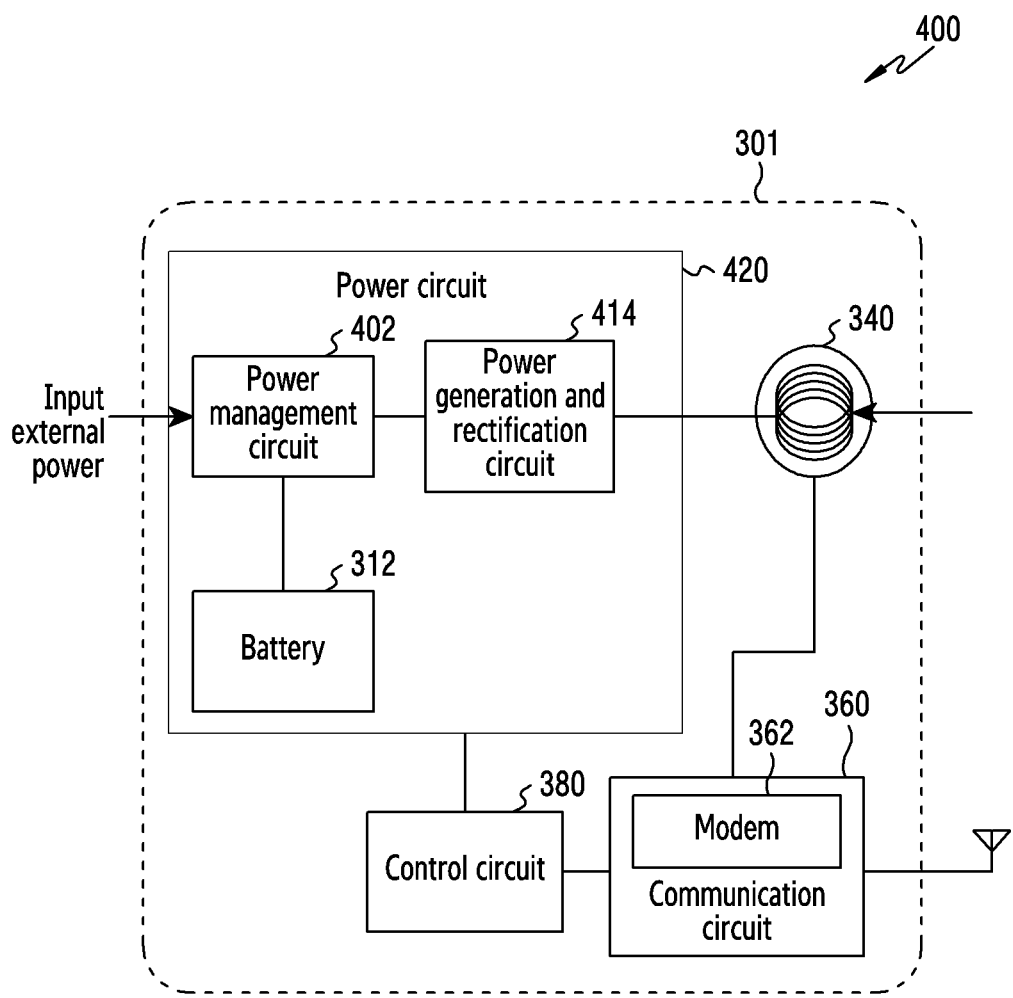
FIG. 4 is a block diagram of another electronic device having a power transfer function and a power reception function for wireless charging according to various embodiments.

FIG. 4 is a block diagram 400 of another electronic device 301 having a power transfer function and a power reception function for wireless charging according to various embodiments. The electronic device 301 (e.g., the electronic device 101 of FIG. 1) according to various embodiments may wirelessly supply power to a different device (e.g., the electronic device 102 of FIG. 1) or may wirelessly receive power from the different device.

Referring to FIG. 4, the electronic device 301 may include a power circuit 420, a coil 340, a communication circuit 360, or a control circuit 380.

The power circuit 420 may include a power management circuit 402, a battery 312, and a power generation and rectification circuit 414. The power management circuit 402 may be a power management integrated circuit (PMIC) including a regulator (e.g., the regulator 310) for charging control of the battery 312. The power generation and rectification circuit 414 may perform a function of the power generation circuit 304, the switching circuit 306, the rectifier circuit 308, or the regulator 310 of FIG. 3. The power generation and rectification circuit 414 and the communication circuit 360 may be configured as one IC. According to various embodiments, for example, in the power transfer mode, the power circuit 420 may provide input power to the power generation and rectification circuit 414 through the power management unit 402, and the power generation and rectification circuit 414 may generate a wireless charging signal. In another example, in the power reception mode, a wireless charging signal received through the coil 340 may be rectified by the power generation and rectification circuit 414 and may then be provided to the power management circuit 402.

Figure 5:
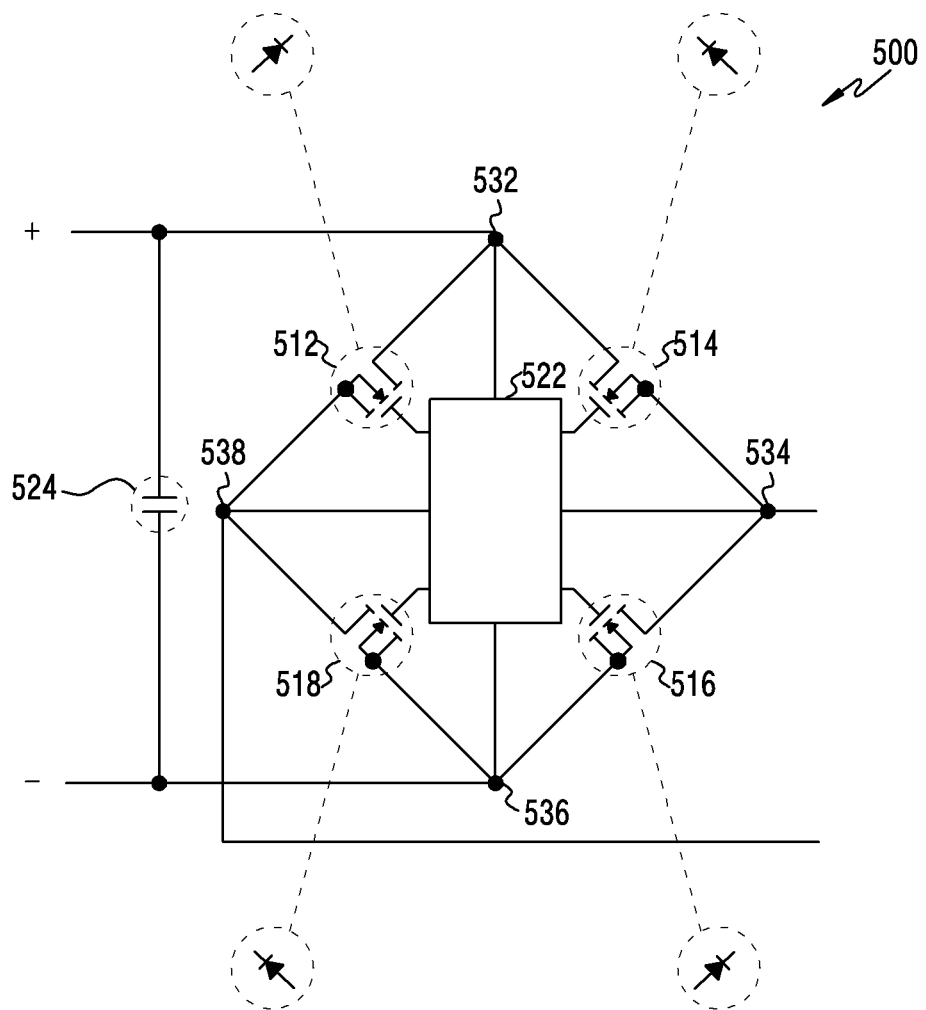
FIG. 5 is an example of an equivalent circuit of a power generation and rectification circuit in a power circuit of an electronic device having a power transfer function and a power reception function for wireless charging according to various embodiments.

FIG. 5 is an example 500 of an equivalent circuit of a power generation and rectification circuit 414 in a power circuit 420 of an electronic device having a power transfer function and a power reception function for wireless charging according to various embodiments.

Referring to FIG. 5, the power generation and rectification circuit 414 may include a first transistor 512, a second transistor 514, a third transistor 516, a fourth transistor 518, a transistor control circuit 522, or a capacitor 524.

A gate of each of the first transistor 512, the second transistor 514, the third transistor 516, and the fourth transistor 518 may be connected to the transistor control circuit 522. A drain of the first transistor 512 and a drain of the second transistor 514 may be connected at a first node 532, a source of the second transistor 514 and a drain of the third transistor 516 may be connected at a second node 534, a source of the third transistor 516 and a source of the fourth transistor 518 may be connected at a third node 536, and a drain of the fourth transistor 518 and a source of the first transistor 512 may be connected at a fourth node 538. Both ends of the capacitor 524 may be connected to the first node 523 and the third node 536.

In the power transfer mode, the transistor control circuit 522 may generate an AC signal by performing control to operate as an inverter. In the power reception mode, the transistor control circuit 522 may perform control to operate as a rectifier circuit. Further, in the power transfer mode, the transistor control circuit 522 may shift the frequency of a generated current according to the impact of a communication circuit (e.g., the communication circuit 360).

According to various embodiments, when the electronic device 301 operates in the wireless power transfer mode, the wireless power generation and rectification circuit 414 may apply external power or power from a battery to the first node 532 and the third node 536 and may alternately repeat an operation of turning on the first transistor 512 and the third transistor 516 and an operation of turning on the second transistor 514 and the fourth transistor 518, thereby generating a wireless power signal. According to various embodiments, when the electronic device 301 operates in the wireless power transfer mode, the wireless power generation and rectification circuit 414 may apply a signal received through a coil 340 to the second node 534 and the fourth node 538 and may rectify the signal using diode characteristics of the transistors 512, 514, 516, and 518.

According to various embodiments of the disclosure, an electronic device (e.g., the electronic device 101) may include: a battery (e.g., the battery 189); a charging circuit (e.g., the power management module 188) configured to control a charging state of the battery; a coil (e.g., the coil 340); a wireless power transfer circuit configured to be electrically connected to the coil; and a control circuit (e.g., the processor 120 or the control circuit 380), wherein the control circuit may be configured to: identify a state related to charging of the battery; transmit a wireless charging parameter related to generation or modification of a power signal to be transmitted to an external electronic device through the coil, the wireless charging parameter being determined at least based on the state related to charging of the battery; receive a response signal corresponding to transmission of the wireless charging parameter from the external electronic device; generate, based on the response signal, a power signal corresponding to an amount of wireless transmission power determined at least based on the response signal using the wireless power transfer circuit; and transmit the power signal to the external electronic device through the coil.

According to various embodiments of the disclosure, the wireless charging parameter may include at least one of an identifier (ID) of the electronic device (e.g., the electronic device 101), a state related to charging of the electronic device, a providable charging mode, a transferrable power amount, or a transferrable voltage.

According to various embodiments of the disclosure, the electronic device may further include a connector (e.g., the connection terminal 178) configured to connect to an external power supply device. The control circuit (e.g., the processor 120 or the control circuit 380) may be configured to identify an amount of power flowing into the electronic device from the external power supply device connected using the connector, an amount of power consumed by the electronic device, or a power charging amount used to charge the battery and to determine the amount of wireless transmission power further based on the amount of power flowing, the amount of power consumed, or the power charging amount.

According to various embodiments of the disclosure, the electronic device may further include a connector (e.g., the connection terminal 178) configured to connect to an external power supply device. The control circuit (e.g., the processor 120 or the control circuit 380) may be configured to identify power supplied from an outside through the connector, to supply at least part of the power supplied from the connector to the wireless power transfer circuit based on the response signal, and to supply at least part of remaining power to the battery.

According to various embodiments of the disclosure, the amount of power consumed may include the amount of power consumed for an operation of the electronic device, and the power charging amount may include the amount of power used to charge the battery of the electronic device.

According to various embodiments of the disclosure, the amount of power consumed for the operation of the electronic device (e.g., the electronic device 101) may be determined based on information about at least one application being executed on the electronic device or information about at least one hardware module that is activated.

According to various embodiments of the disclosure, the control circuit (e.g., the processor 120 or the control circuit 380) may be configured to determine the amount of wireless transmission power based on the wireless charging parameter.

According to various embodiments of the disclosure, the wireless charging parameter may include at least one of information indicating a change in the charging state, information indicating a charging mode to be changed, or information indicating that a charging mode transition is possible.

According to various embodiments of the disclosure, the control circuit (e.g., the processor 120 or the control circuit 380) may be configured to identify whether the external electronic device (e.g., the electronic device 102) supports a fast charging mode based on a wireless charging parameter received from the external electronic device.

According to various embodiments of the disclosure, the response signal may include a signal for requesting a change of the amount of wireless transmission power from a first level to a second level from the external electronic device (e.g., the electronic device 102).

According to various embodiments of the disclosure, the first level may be the amount of wireless transmission power supplied in a normal charging mode, and the second level may be the amount of wireless transmission power supplied in a fast charging mode.

According to various embodiments of the disclosure, the charging state may include at least one of a state related to external power, a state related to internal power consumption, or a heat generation degree due to a charging operation.

According to various embodiments of the disclosure, the control circuit (e.g., the processor 120 or the control circuit 380) may be configured to transmit a ping signal to the external electronic device (e.g., the electronic device 102), to receive a response signal to the ping signal from the external electronic device, and to control the charging circuit to reduce power, a current, or a voltage supplied to the battery before transmitting power to the external electronic device.

According to various embodiments of the disclosure, the control circuit (e.g., the processor 120 or the control circuit 380) may be configured to identify power supplied from an outside through the connector, to supply at least part of the power supplied from the connector to the wireless power transfer circuit based on the response signal, and to supply at least part of remaining power to the battery.

According to various embodiments of the disclosure, the response signal may include a wireless charging parameter of the external electronic device (e.g., the electronic device 102), and the wireless charging parameter of the external electronic device may include at least one of a charging-related capability of the external electronic device, a charging-related state of the external electronic device, or an amount of power that the external electronic device can receive.

According to various embodiments of the disclosure, the electronic device may further include a communication circuit (e.g., the communication circuit 360). The control circuit (e.g., the processor 120 or the control circuit 380) may be configured to transmit the power signal through an antenna, which is different from the coil for transmitting the power signal, using the communication circuit.

According to various embodiments of the disclosure, the control circuit (e.g., the processor 120 or the control circuit 380) may be configured to transmit the wireless charging parameter using the coil.

According to various embodiments of the disclosure, the control circuit (e.g., the processor 120 or the control circuit 380) may be configured to disable a wireless charging operation when a battery (e.g., the battery 189) level or the charging state does not satisfy a specified condition.

According to various embodiments of the disclosure, the control circuit (e.g., the processor 120 or the control circuit 380) may be configured to disable the wireless charging operation by stopping transmission of a ping signal.

According to various embodiments of the disclosure, the control circuit (e.g., the processor 120 or the control circuit 380) may be configured to disable the wireless charging operation by including information indicating that provision of wireless charging is stopped in the wireless charging parameter.

According to various embodiments of the disclosure, an electronic device (e.g., the electronic device 101) may include: a connector (e.g., the connection terminal 178) configured to connect to external power; a battery (e.g., the battery 189); a charging circuit (e.g., the power management module 188) configured to control a charging state of the battery; a coil (e.g., the coil 340); a wireless power transfer circuit configured to be electrically connected to the coil; and a control circuit (e.g., the processor 120 or the control circuit 380), wherein the control circuit may be configured to: charge the battery with the external power input through the connector using the charging circuit and to transmit a first power signal, which is generated using the wireless power transfer circuit, to an external electronic device through the coil; identify a state related to charging of the battery; transmit a wireless charging parameter determined at least based on the state related to charging of the battery to the external electronic device through the coil; receive a response signal corresponding to transmission of the wireless charging parameter from the external electronic device; transmit, based on the response signal, a second power signal to the external electronic device using the wireless power transfer circuit.

Figure 6:
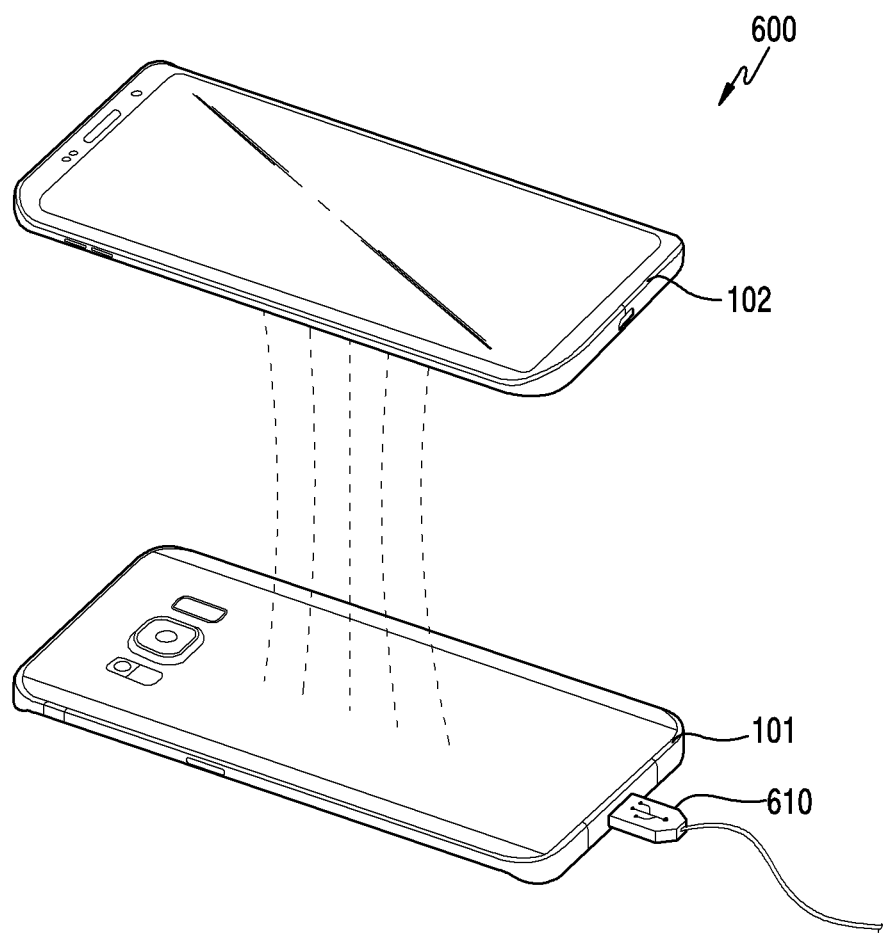
FIG. 6 is an example of wireless charging using an electronic device according to various embodiments.

FIG. 6 is an example 600 of wireless charging using an electronic device according to various embodiments. Referring to FIG. 6, an electronic device 101 may generate a signal for wireless charging, and an electronic device 102 may charge a battery (e.g., the battery 189) using the signal generated by the electronic device 101. With the electronic device 101 connected to an adapter 610, external power may be supplied to the electronic device 101. In this case, according to various embodiments, the electronic device 101 may charge a battery (e.g., battery 189) of the electronic device 101 using the external power and may generate a charging signal for charging the electronic device 102 at the same time.

Referring to FIG. 6, the charging signal may be radiated through a rear portion of the electronic device 101. To this end, a coil (e.g., the coil 340) may be disposed inside a rear cover of the electronic device 101. Since a printed circuit board (PCB), an internal housing, or a liquid crystal display (LCD) disposed in front of the coil of the electronic device 101 may generate heat due to the impact of the charging signal, a shielding agent may be installed around the coil to reduce the impact on other circuits. Accordingly, during wireless charging, the rear portion of the electronic device 101 may be mainly used.

Figure 7:
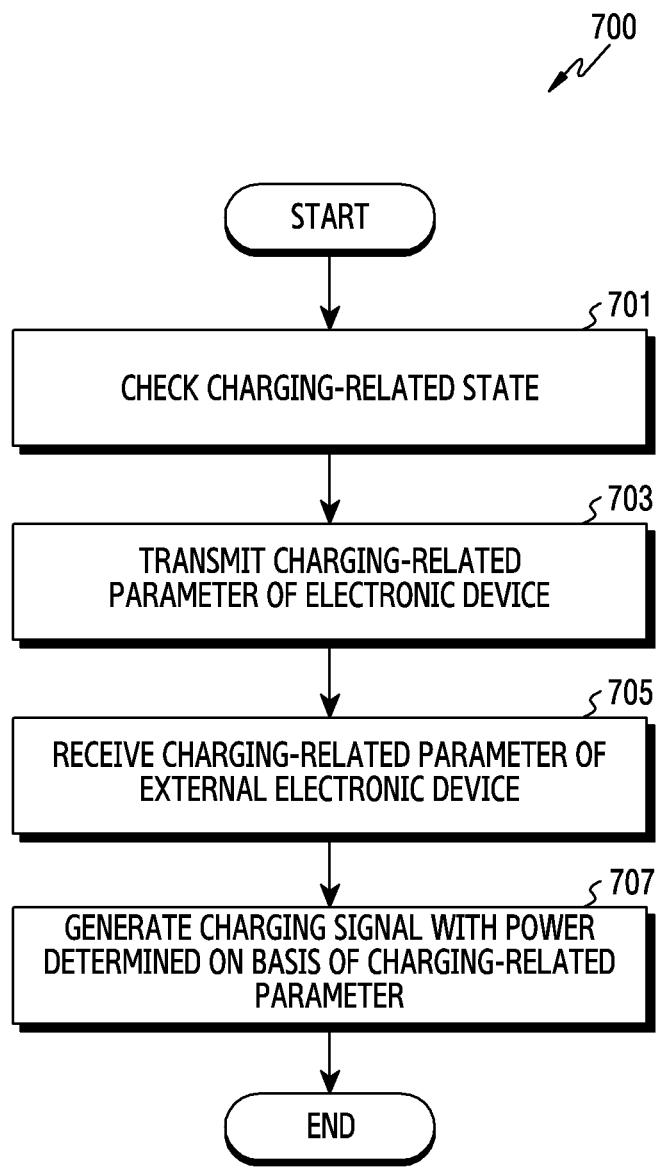
FIG. 7 is a flowchart showing that an electronic device generates a charging signal according to various embodiments.

FIG. 7 is a flowchart 700 showing that an electronic device generates a charging signal according to various embodiments. The subject of operations in the flowchart 700 illustrated in FIG. 7 may be understood as the electronic device 101 or a component (e.g., the processor 120) of the electronic device 101.

Referring to FIG. 7, in operation 701, the electronic device 101 (e.g., the processor 120) may identify a charging-related state. The charging-related state may be associated with pieces of information used to determine at least one parameter related to charging. For example, the charging-related state may include a state related to external power, a state related to internal power consumption, or various states depending on a battery charging operation.

In operation 703, the electronic device 101 may transmit at least one charging-related parameter of the electronic device 101 to an external electronic device (e.g., the electronic device 102). The at least one charging-related parameter may be determined based on at least one charging parameter among a charging-related state of the electronic device 101, a charging-related capability of the electronic device 101, or information about an external power source (e.g., whether the external power source is connected or the type of the external power source).

In operation 705, the electronic device 101 may receive at least one charging-related parameter of the external electronic device. The at least one charging-related parameter may include a charging-related capability of the external electronic device (e.g., whether the external electronic device supports a fast charging mode), a charging mode change request (voltage change of a wireless power signal or power amount change), and a charging-related state of the external electronic device (e.g., the voltage, current, or power of a signal received by the reception circuit 251 or a battery charge amount), or at least one charging parameter of the electronic device 101.

In operation 707, the electronic device 101 may generate a charging signal with power determined based on the at least one charging-related parameter of the external electronic device. For example, the charging signal may have a frequency set according to the at least one charging-related parameter of the external electronic device. For example, the charging signal may have an amount of power determined based on the charging-related state of the electronic device 101. Accordingly, the external electronic device may charge a battery using the charging signal generated by the electronic device 101.

According to the embodiment described with reference to FIG. 7, the electronic device 101 may determine transmission power, may generate a wireless charging signal, and may provide the wireless charging signal to the external electronic device. The electronic device 101 may receive a response signal from the external electronic device and may generate transmission power based on the response signal (e.g., a charging-related parameter). In FIG. 7, after transmitting the charging-related parameter of the electronic device 101, the electronic device 101 may receive the charging-related parameter of the external electronic device. According to another embodiment, the electronic device 101 may transmit the charging-related parameter of the electronic device 101 after receiving the charging-related parameter of the external electronic device.

Figure 8:
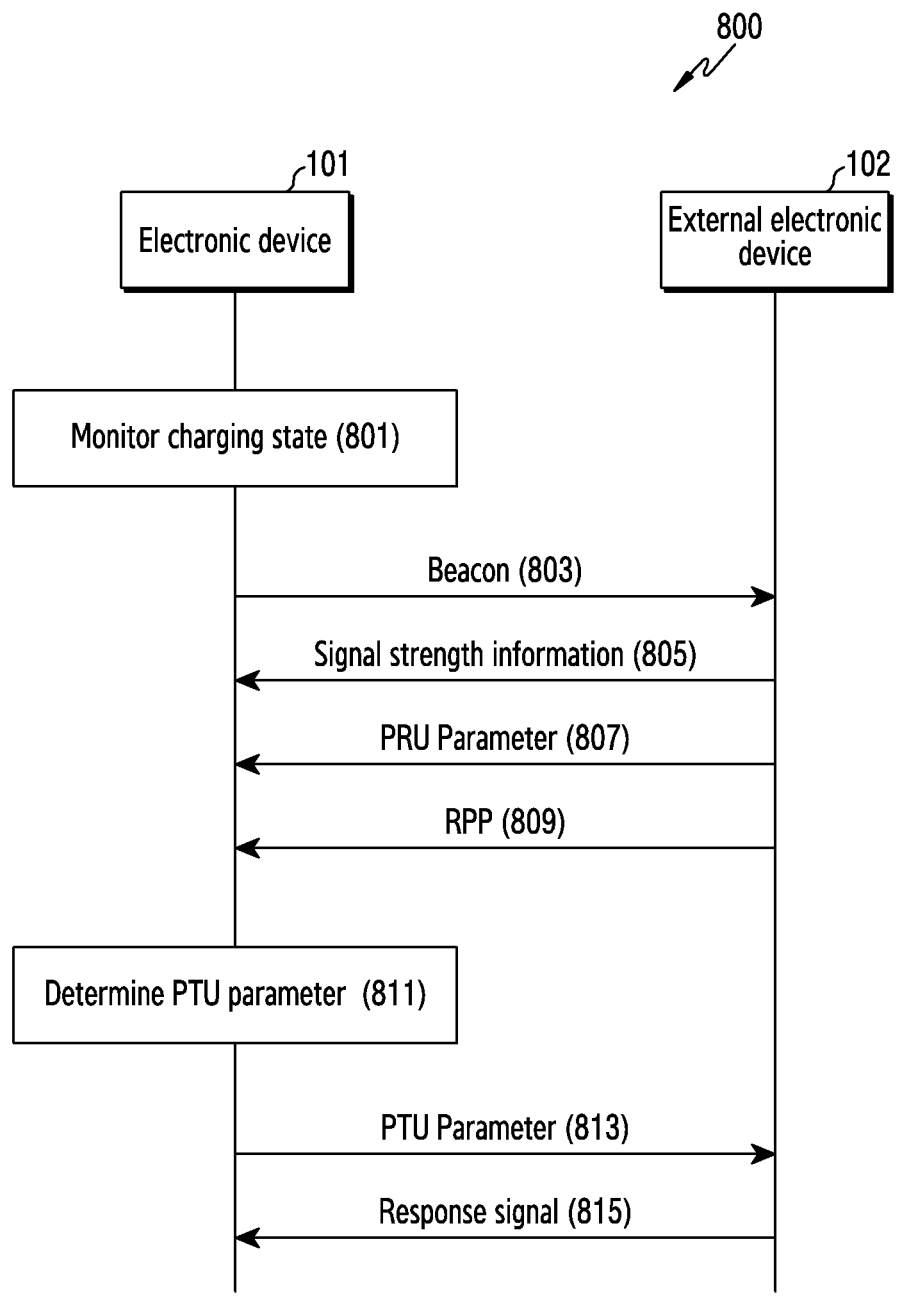
FIG. 8 is a signal exchange diagram for wireless charging between electronic devices according to various embodiments.

FIG. 8 is a signal exchange diagram 800 for wireless charging between electronic devices according to various embodiments. The signal exchange diagram 800 of FIG. 8 illustrates a signal exchange between an electronic device 101 corresponding to the operations of the electronic device 101 described with reference to FIG. 7 and an external electronic device 102.

Referring to FIG. 8, in operation 801, the electronic device 101 may monitor a charging state. The electronic device 101 may identify a charging-related state. For example, the electronic device 101 may identify a battery voltage (e.g., a battery of the electronic device 101), the state of a charging current, or a heat generation state due to a charging operation.

In operation 803, the electronic device 101 may transmit a beacon signal to the external electronic device 102. A beacon is transmitted as a ping signal and may be referred to as a digital ping or a power beacon. Due to the beacon signal, the external electronic device 102 may recognize that the electronic device 101 can transmit a charging signal for wireless charging. According to another embodiment, the electronic device 101 may output an analog ping signal having a specific voltage.

In operation 805, the external electronic device 102 may transmit signal strength information to the electronic device 101. The signal strength information may indicate the reception strength of the beacon signal received by the external electronic device 102. The external electronic device 102 may transmit the signal strength information in response to the beacon signal. That is, the electronic device 101 may receive the signal strength information (signal strength power (SSP)) from the external electronic device 102, thereby recognizing proximity of the external electronic device 102. The electronic device 101 may recognize the external electronic device 102 to which wireless power is transferred.

In operation 807, the external electronic device 102 may transmit a power receiving unit (PRU) parameter to the electronic device 101. The PRU parameter may include identification information or configuration information about the external electronic device 102. The PRU parameter may include charging-related information about the external electronic device 102. For example, the PRU parameter may indicate at least one of an identifier (ID) of the external electronic device 102, a property (e.g., charging-related capability or battery capacity) of the external electronic device 102, a state value (e.g., battery charge amount) of the external electronic device 102, the amount of power that the external electronic device 102 can receive, a voltage that the external electronic device 102 can transmit, a reception power mode of the external electronic device 102, or data related to a power signal generated by the external electronic device 102. According to an embodiment, the PRU parameter may be transmitted through the same frequency band as that for a charging signal or through a different frequency band. The PRU parameter may be transmitted through a radio access technology (RAT) (e.g., Bluetooth, BLE, Wi-Fi, or NFC) different from that for transmitting the charging signal.

In operation 809, the external electronic device 102 may transmit a received power packet (RPP) to the electronic device 101. The RPP may be periodically transmitted during wireless charging. Through the RPP, the electronic device 101 may recognize that a wireless charging process is in progress. Alternatively, the electronic device 101 may recognize the charging state of the external electronic device 102.

In operation 811, the electronic device 101 may determine a power transmitting unit (PTU) parameter. The PTU parameter may include control information or configuration information about the electronic device 101. The PTU parameter may include charging-related information about the electronic device 101. For example, the PTU parameter may indicate at least one of an ID of the electronic device 101, a property of the electronic device 101, a state value (e.g., external power type or remaining battery level) of the electronic device 101, a charging mode that the electronic device 101 can provide, or the amount of power that the electronic device 101 can transfer.

In operation 813, the electronic device 101 may transmit the PTU parameter to the external electronic device 102. According to an embodiment, the PTU parameter may be transmitted using a coil 340. Alternatively, the PTU parameter may be transmitted through a RAT (e.g., Bluetooth, BLE, Wi-Fi, or NFC) different from that for transmitting the charging signal.

In operation 815, the external electronic device 102 may transmit a response signal to the electronic device 101. Upon receiving the response signal, the electronic device 101 may generate a power signal transmitted through the coil based on the response signal. For example, the electronic device may identify power supplied from the outside through a connector (e.g., the adapter 610), may supply at least part of the power supplied from the connector to a wireless power transfer circuit based on the response signal, and may supply at least part of the remaining power to a battery (e.g., the battery 189).

As described in the embodiment with reference to FIG. 8, the electronic device 101 may trigger a wireless charging process by transmitting a ping signal. However, according to another embodiment, when it is determined that power to be allocated to a charging signal for wireless charging is insufficient, the electronic device 101 may stop transmitting the ping signal, thereby disabling a wireless charging function. For example, when the charging capacity of the battery is less than a threshold value, the electronic device 101 may determine that the power to be allocated to the charging signal for wireless charging is insufficient. According to another embodiment, when it is determined that the power to be allocated to the charging signal for wireless charging is insufficient, the electronic device 101 may include information indicating a state in which wireless charging cannot be provided in the ping signal or a PTU parameter. According to another embodiment, when the amount of heat generated due to a charging operation exceeds a threshold value, the electronic device 101 may stop transmitting the ping signal, thereby disabling the wireless charging function.

In the embodiments described with reference to FIG. 7 and FIG. 8, the electronic device 101 may determine the amount of power that can be transferred for wireless charging. The amount of power that can be transferred may be determined based on a wireless charging-related state of the electronic device 101. An embodiment of determining the amount of power that can be transferred will be described below with reference to FIG. 9.

Figure 9:
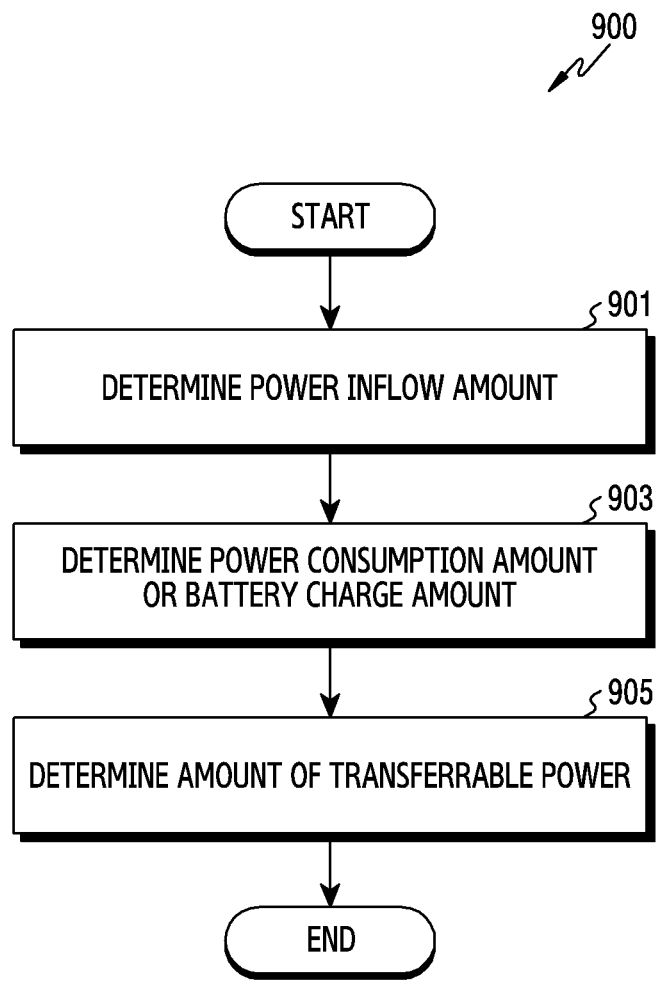
FIG. 9 is a flowchart showing that an electronic device determines the amount of power for wireless charging according to various embodiments.

FIG. 9 is a flowchart 900 showing that an electronic device determines the amount of power for wireless charging according to various embodiments. The subject of operations in the flowchart 900 illustrated in FIG. 9 may be understood as the electronic device 101 or a component (e.g., the processor 120) of the electronic device 101.

Referring to FIG. 9, in operation 901, the electronic device 101 (e.g., the processor 120) may determine a power inflow amount. When the electronic device 101 is connected to an external power source through an adapter (e.g., the adapter 410), external power may be supplied. Accordingly, the electronic device 101 may determine the amount of power supplied from the outside. The power inflow amount may be determined by measurement or may be determined according to the type of the external power source. For example, the power inflow amount may be determined by a power management circuit (e.g., the power management circuit 302 or the power management circuit 402) measuring the amount of power supplied from the outside.

In operation 903, the electronic device 101 may determine a power consumption amount or a battery charge amount. The power consumption amount may include the amount of power consumed for the operation of the electronic device 101, and the battery charge amount may include the amount of power consumed to charge a battery of the electronic device 101. The power consumption amount may be determined by measurement or may be determined based on a state. For example, the electronic device 101 may determine the power consumption amount or the battery charge amount based on a charging state of the battery, the type or number of applications being executed, the AP occupancy rate of an application, or the type or number of activated hardware modules.

In operation 905, the electronic device 101 may determine the amount of transferrable power. The electronic device 101 may determine the amount of transferrable power by subtracting the power consumption amount or the battery charge amount from the power inflow amount. According to an embodiment, the electronic device 101 may determine the amount of transferrable power in consideration of a margin. According to an embodiment, the amount of transferrable power may be determined based on not only a current state but also a predicted future state. The predicted state may be determined based on statistics on usage of the electronic device 101.

As described in the embodiment with reference to FIG. 9, an electronic device 101 may determine the amount of transferrable power for wireless charging. A PRU parameter or a PTU parameter may be exchanged to determine the amount of transferrable power. Before transmitting the PTU parameter, the electronic device 101 may detect the amount of power supplied from the external power source or the amount of power supplied to the battery and may determine the maximum amount of transferrable power based on the detected information. An electronic device 102 may adjust the amount of wirelessly charged power based on the PTU parameter.

According to various embodiments, before starting wireless charging, the electronic device 101 may supply power of a first level to the battery. The electronic device 101 may enter a wireless charging identification phase or configuration phase with the electronic device 102, may identify a battery charging power state or a battery charge level, and may transmit a PTU parameter. When the battery capacity of the electronic device 101 is less than a specified capacity (e.g., about 20%), the electronic device 101 may maintain the power of the first level and may transmit data related to first wireless power that can be supplied when transmitting the PTU parameter. When the battery capacity of the electronic device 101 is high, the electronic device 101 may determine to supply power of a second level less than the first level to the battery, and may transmit information about second wireless power, which is greater than the first power, when transmitting the PTU parameter.

According to various embodiments, according to the situation of the electronic device 101 (e.g., screen on/off, an application being executed, or a battery charging state (e.g., a constant current (CC) period or a constant voltage (CV) period), information about power that can be supplied from the electronic device 101 may be changed and maximum power that can be transferred may be changed. The electronic device 101 may detect the state of power used for the system. For example, the electronic device 101 may determine power consumed by a main component, such as a display (e.g., the display device 160), a processor (e.g., the processor 120), a camera (e.g., the camera module 180), or a communication module 190, may determine a PTU parameter based on power consumption, and transmit the PTU parameter.

According to various embodiments, the electronic device 101 may transmit a charging signal after receiving SSP or a PRU parameter from the electronic device 102. The electronic device 101 may transmit a PTU parameter to the electronic device 102 after transmitting the charging signal. The electronic device 101 and the electronic device 102 may then perform an operation for a power mode change. When the PTU parameter is changed in a power transfer period, the electronic device 101 may transmit the changed PTU parameter to the electronic device 102. The amount of power transferred between the electronic device 101 and the electronic device 102 may be reset using the changed PTU parameter. An embodiment of resetting the amount of power will be described below with reference to FIG. 10 and FIG. 11.

Figure 10:
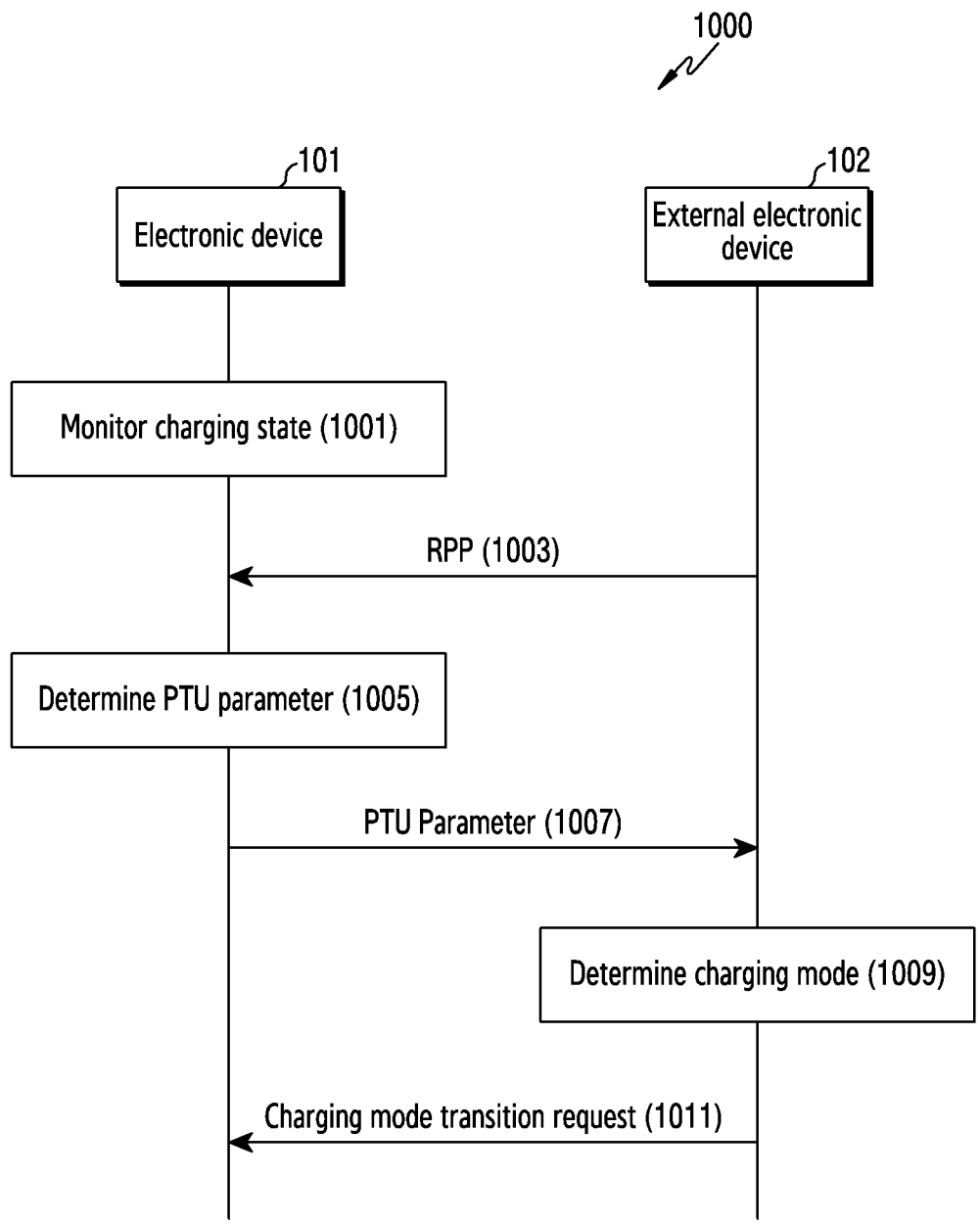
FIG. 10 is a signal exchange diagram for a charging mode transition during wireless charging between electronic devices according to various embodiments.

FIG. 10 is a signal exchange diagram 1000 for a charging mode transition during wireless charging between electronic devices according to various embodiments. The signal exchange diagram 1000 of FIG. 10 illustrates a signal exchange between an electronic device 101 and an external electronic device 102 after wireless charging starts through a process illustrated in FIG. 8.

Referring to FIG. 10, in operation 1001, the electronic device 101 may monitor a charging state (e.g., a charging state of the electronic device 101). The electronic device 101 may identify a charging-related state. For example, the electronic device 101 may identify a battery voltage, the state of a charging current, or a heat generation state due to a charging operation.

In operation 1003, the external electronic device 102 may transmit an RPP to the electronic device 101. The RPP may be periodically transmitted during wireless charging. Through the RPP, the electronic device 101 may recognize that a wireless charging process is in progress. Operation 1001 and operation 1003 may be continuously performed.

When a predefined condition is satisfied during the monitoring, operation 1005 may be performed below.

In operation 1005, the electronic device 101 may determine a PTU parameter. The PTU parameter may include control information or configuration information about the electronic device 101. The PTU parameter may include charging-related information about the electronic device 101. For example, the PTU parameter may indicate at least one of an ID of the electronic device 101, a property of the electronic device 101, a state value of the electronic device 101, or the amount of power/voltage that the electronic device 101 can transfer. When a specified condition is satisfied during monitoring the charging state, the electronic device 101 may determine the PTU parameter.

In operation 1007, the electronic device 101 may transmit the PTU parameter to the external electronic device 102. According to an embodiment, the PTU parameter may be transmitted through the same frequency band as that for a charging signal or through a different frequency band. The PTU parameter may be transmitted through a RAT (e.g., Bluetooth, BLE, Wi-Fi, or NFC) different from that for transmitting the charging signal. As a result of monitoring in operation 1001, when there is a change in the charging-related state, the electronic device 101 may include information indicating a change in the charging-related state, information indicating that a charging mode can be changed, or information indicating a changeable charging mode.

In operation 1009, the external electronic device 102 may determine a charging mode. The external electronic device 102 may determine the charging mode based on the PTU parameter received from the electronic device 101 or a charging-related property or state of the external electronic device 102. Accordingly, it may be determined to maintain a current charging mode or to change to a different charging mode.

In operation 1011, the external electronic device 102 may transmit a charging mode transition request signal to the electronic device 101. The charging mode transition request signal may include an indication of requesting a transition to a charging mode different from the currently operating charging mode or information indicating a different charging mode. According to an embodiment, the charging mode transition request signal may be transmitted through the same frequency band as that for the charging signal or through a different frequency band. The charging mode transition request signal may be transmitted through a RAT (e.g., Bluetooth, BLE, Wi-Fi, or NFC) different from that for transmitting the charging signal.

Figure 11:
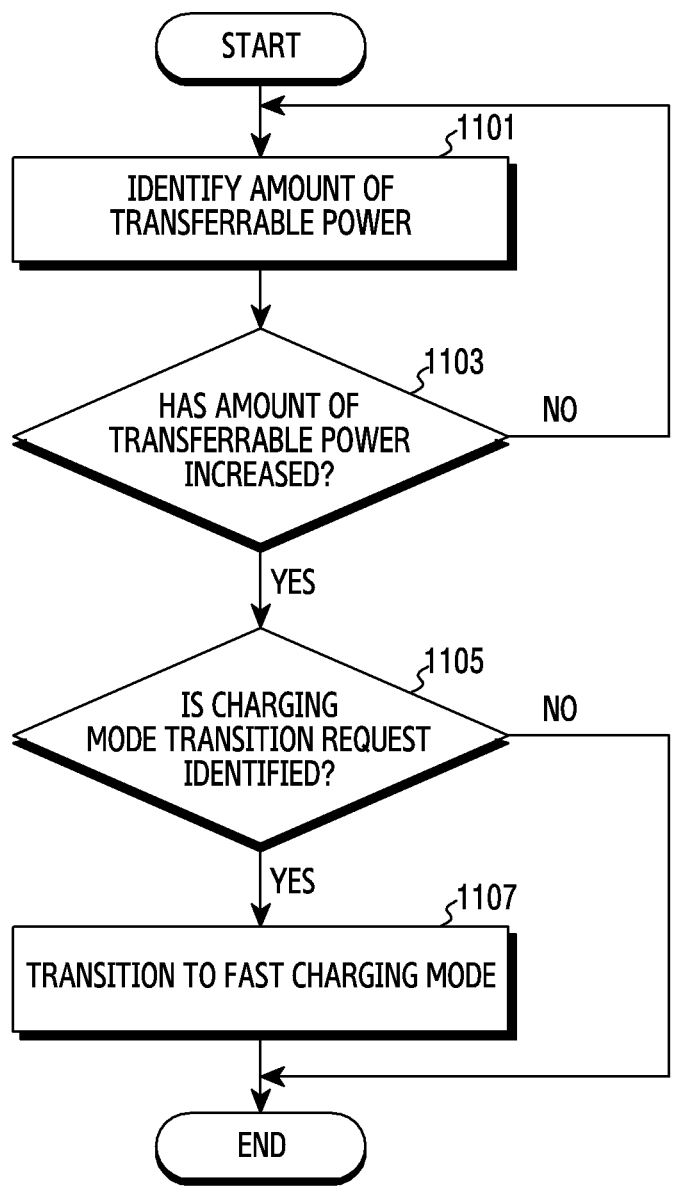
FIG. 11 is a flowchart showing that an electronic device transitions to a mode for wireless charging according to various embodiments.

FIG. 11 is a flowchart 1100 showing that an electronic device transitions to a mode for wireless charging according to various embodiments. The subject of operations in the flowchart 1100 illustrated in FIG. 11 may be understood as the electronic device 101 or a component (e.g., the processor 120) of the electronic device 101. A flowchart 1100 illustrated in FIG. 11 shows a specific case of a charging mode transition, which illustrates a transition from a normal charging mode to a fast charging mode.

Referring to FIG. 11, in operation 1101, the electronic device 101 (e.g., the processor 120) may identify the amount of transferable power. The amount of transferable power may be determined based on a charging-related state of the electronic device 101. For example, the electronic device 101 may identify a power inflow amount or a power consumption amount and may calculate the amount of transferrable power based on the determined power inflow amount or power consumption amount. Here, identifying the amount of transferrable power may include an operation of identifying the amount of transferrable power, an operation of identifying a variance (e.g., an increase or decrease) in the amount of transferrable power, or an operation of identifying whether the amount of transferrable power is changed.

In operation 1103, the electronic device 101 may determine whether the amount of transferrable power has increased. When the amount of transferrable power has not increased, the electronic device 101 may return to operation 1101. However, although not shown in FIG. 11, according to another embodiment, when the amount of transferrable power has decreased, the electronic device 101 may perform an operation according to the decrease in the amount of transferrable power.

When the amount of transferrable power has increased, the electronic device 101 may determine whether a charging mode transition request from an external electronic device (e.g., the electronic device 102) is identified in operation 1105. The electronic device 101 may determine whether the charging mode transition request is identified based on a PTU parameter received from the external electronic device. When the charging mode transition request is not identified, the electronic device 101 may terminate this process.

When the charging mode transition request is identified, the electronic device 101 may transition to the fast charging mode in operation 1107. The electronic device 101 may increase the power of a charging signal to a value enabling fast charging. Accordingly, the amount of power provided to a battery or another component of the electronic device 101 may be reduced. According to an embodiment, to transition to the fast charging mode, the electronic device 101 may re-perform an initialization operation, a ping operation, an identification or configuration operation. Alternatively, according to another embodiment, the electronic device 101 may re-perform the identification or configuration operation except for the ping operation.

According to various embodiments of the disclosure, an electronic device (e.g., the electronic device 101) may identify the amount of transferrable power (1101), and may reconfigure a PTU parameter to be transmitted to an external electronic device (e.g., the electronic device 102) when the amount of transferrable power has increased. The electronic device 101 may monitor a charging state and may determine the amount of transferable power of the amount of external power flowing into the electronic device 101. The electronic device 101 may reconfigure the PTU parameter to be transmitted when recognizing the external electronic device 102 according to the amount of power that can be supplied to the external electronic device.

According to various embodiments of the disclosure, an operating method of an electronic device (e.g., the electronic device 101) may include: identifying a battery level or a charging state; transmitting a wireless charging parameter related to generation or modification of a power signal to be transmitted to an external electronic device (e.g., the electronic device 102) through a coil when the battery level or the charging state satisfies a specified condition; receiving a response signal to the transmitted wireless charging parameter from the external electronic device; or generating, based on the response signal, a power signal transmitted through the coil using the wireless power transfer circuit.

Figure 12:
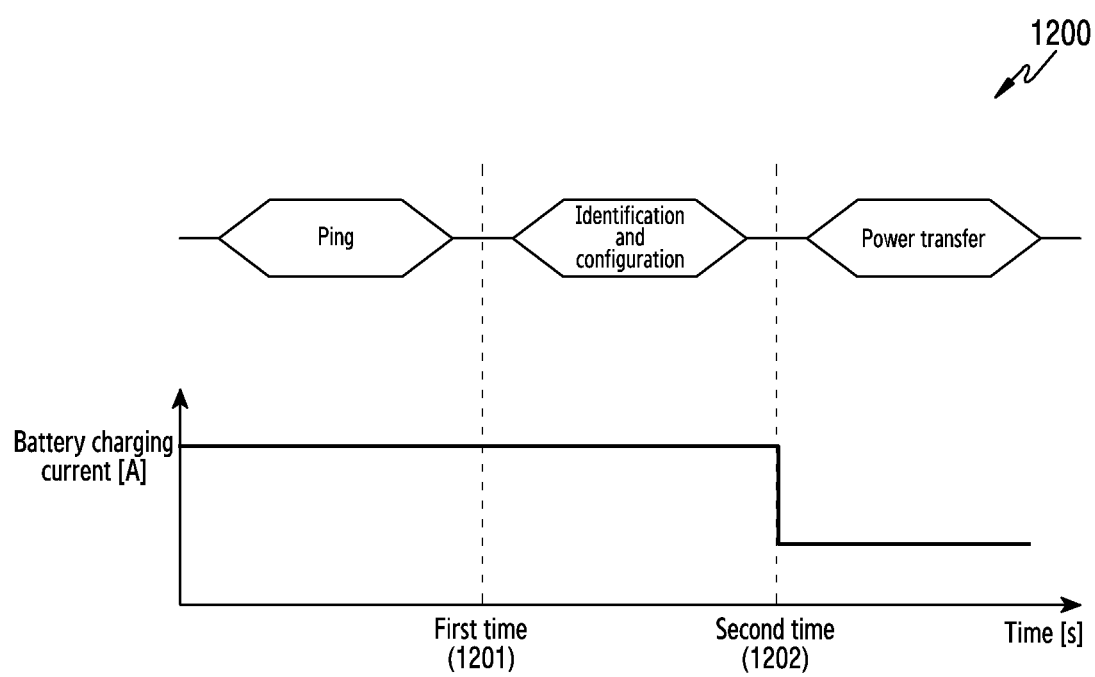
FIG. 12 is an example of a change in the battery charging current of an electronic device during wireless charging according to various embodiments.

FIG. 12 is an example 1200 of a change in the battery charging current of an electronic device during wireless charging according to various embodiments. The example 1200 of FIG. 12 illustrates a change in the internal power consumption amount (e.g., battery charging current) of the electronic device 101 over time during wireless charging.

Referring to FIG. 12, the electronic device 101 may initially receive external power through a power connector. For example, when connected to a travel adapter (TA) having a rated capacity of about 15 W, the electronic device 101 may receive power of about 15 W. The electronic device 101 may use the received power to charge a battery.

According to various embodiments, the electronic device 101 may operate in a ping phase to identify a wireless charging request from an electronic device 102. When receiving a response from the electronic device 102, the electronic device 101 may enter an identification and configuration phase at a first time 1201. Accordingly, a configuration for power charging and transfer between the electronic device 101 and the electronic device 102 may be performed. The electronic device 101 may reduce a battery charging current before supplying power to the electronic device 102. For example, the battery charging current may be reduced at a second time 1202 in order to activate wireless charging of the electronic device 102.

According to various embodiments, another example of a change in the amount of supplied power according to a charging state of the electronic device 101 is shown below in Table 1.

TABLE 1

| Time | Battery charge amount | Amount of wirelessly supplied power |
|---|---|---|
| t0 | 15 W | 0 W |
| t1 | 10 W | 5 W |
| t2 | 0 W | 15 W |

Referring to Table 1, at time t0, the electronic device 101 is in a state of not transmitting a charging signal and may charge the battery with first power (e.g., about 15 W). At time t1, the electronic device 101 may charge the battery with second power (e.g., about 10 W) less than the first power and may transfer first wireless power to an external electronic device (e.g., the electronic device 102). At time t2, the electronic device 101 may charge the battery with third power (e.g., about 0 W) less than the second power and may transfer second wireless power (e.g., about 15W) to the external electronic device (e.g., the electronic device 102). That is, at time t2, the electronic device 101 may finish charging the battery and may transfer the second wireless power to the external electronic device. For example, the electronic device 101 may perform fast wireless charging. According to various embodiments, the third power less than the second power may be, for example, about 0.1 to 5 W, and the remaining power in addition to the received power (e.g., about 15 W) may be supplied as wireless power.

When the amount of power for wirelessly supplying power is changed, the electronic device 101 may perform a configuration operation for changing the amount of wireless charging power in a power transfer period. For example, at time t1 or time t2, the electronic device 101 may perform an initial operation, a ping operation, and an identification or configuration operation. Accordingly, the electronic device 101 may transmit a changed PTU parameter to the external electronic device. That is, the electronic device 101 may re-perform the initial operation, the ping operation, and the identification or configuration phase through a renegotiation operation. Alternatively, according to another embodiment, the electronic device 101 may perform the identification and configuration or renegotiation operation excluding the ping operation.

The electronic device 101 may determine the amount of power that can be received or whether normal/fast wireless charging is supported using a PRU parameter received from the external electronic device and may change a wireless charging power supply mode. For example, when the external electronic device does not support fast wireless charging, the electronic device 101 may not additionally perform an operation of changing the amount of wireless power.

Figure 13:
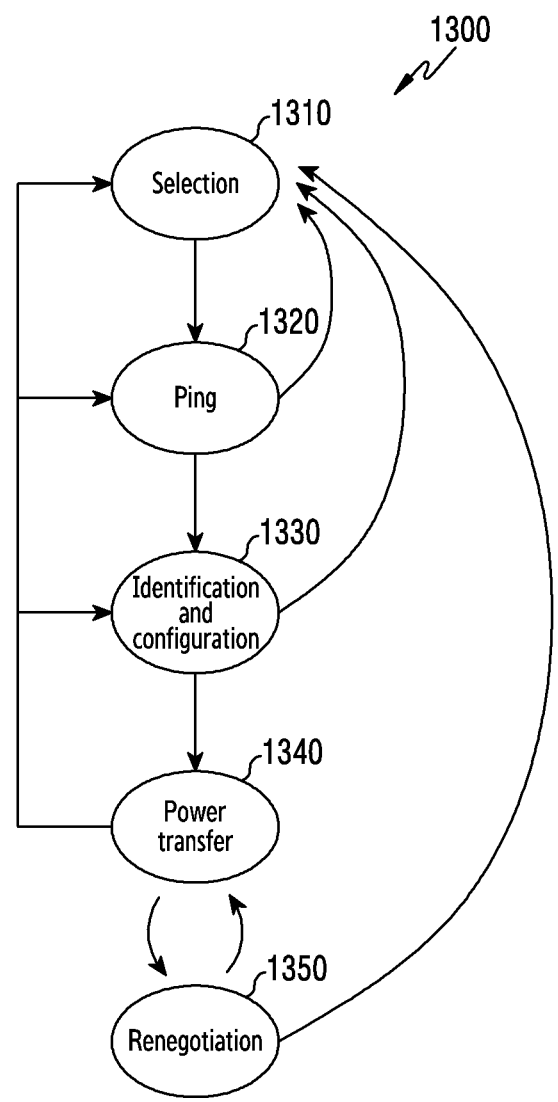
FIG. 13 is a state transition diagram of an electronic device according to various embodiments.

FIG. 13 is a state transition diagram 1300 of an electronic device according to various embodiments. The state transition diagram 1300 of FIG. 13 illustrates various states of the electronic device 101 related to wireless charging.

Referring to FIG. 13, the electronic device 101 may operate in one of a selection state 1310, a ping state 1320, an identification and configuration state 1330, a power transfer state 1340, and a renegotiation state 1350. The selection state 1310 may be a state in which enabling/disabling wireless charging is determined. When an object to be charged (e.g., the electronic device 102) is detected in the selection state 1310, the electronic device 101 may transition to the ping state 1320. The ping state 1320 may be a state of transmitting a ping signal and waiting for a response. When no response is received, the electronic device 101 may transition back to the selection state 1310. When the response is identified, the electronic device 101 may transition to the identification and configuration state 1330. The identification and configuration state 1330 may be a state in which information about the object to be charged is obtained and a charging-related variable is set. When charging starts in the identification and configuration state 1330, the electronic device 101 may transition to the power transfer state 1340. The power transfer state 1340 may be a state in which a charging signal is generated or radiated. When a charging-related state of the electronic device 101 is changed in the power transfer state 1340, the electronic device 101 may transition to the renegotiation state 1350. The renegotiation state 1350 may be a state in which a charging-related parameter is exchanged or the charging-related variable is reset. When the charging-related variable is reset through the renegotiation state 1350, the electronic device 101 may transition to the power transfer state 1340.

The proximity of the electronic device 101 to an external electronic device (e.g., the electronic device 102) is recognized, and necessary information may be exchange through in-band communication or out-of-band communication in the identification and configuration state 1330 in the ping state 1320. When the electronic device 101 transmits a PTU parameter to the external electronic device, the parameter may be transmitted based on a charging-related state of the electronic device 101. Subsequently, power may be transferred in the power transfer state 1340. In the renegotiation state 1350, power supplied from the electronic device 101 to the external electronic device may be changed according to the PTU parameter. That is, a charging mode may be changed according to a power charging state of the electronic device 101.

According to various embodiments, the electronic device 101 may monitor a charging state and may determine the amount of transferable power of the amount of external power flowing into the electronic device 101. The electronic device 101 may reconfigure a PTU parameter to be transmitted when recognizing the external electronic device 102 according to the amount of power that can be supplied to the external electronic device. The electronic device 101 may transition from the power transfer state 1340 to the renegotiation state 1350, the identification and configuration state 1330, or the ping state 1320 for an operation of detecting an object to be charged (e.g., the electronic device 102) and may transmit the PTU parameter. The electronic device 101 may transmit transmission power (e.g., maximum power or guaranteed power), transmission signal voltage information, or the like.

An electronic device according to various embodiments disclosed herein may include various types of devices. The electronic device may include, for example, a portable communication device (e.g., a smailphone), a computer device, a portable multimedia device, a portable medical device, a camera, a wearable device, or a home appliance. The electronic device according to the embodiments disclosed herein is not limited to the foregoing devices.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
   a battery;
   a charging circuit configured to control a charging state of the battery;
   a coil;
   a wireless power transfer circuit configured to be electrically connected to the coil; and
   a control circuit,
   wherein the control circuit is configured to:
      identify a state related to charging of the battery;
      transmit a wireless charging parameter related to generation or modification of a power signal to be transmitted to an external electronic device through the coil, the wireless charging parameter being determined at least based on the state related to charging of the battery;
      receive a response signal corresponding to transmission of the wireless charging parameter from the external electronic device;
      generate, based on the response signal, a power signal corresponding to an amount of wireless transmission power determined at least based on the response signal using the wireless power transfer circuit;
      transmit the power signal to the external electronic device through the coils;
      in case that an external power supply device is connected to the electronic device:
         identify an amount of power flowing into the electronic device from the external power supply device,
         determine a transferrable power amount based on the amount of power flowing into the electronic device from the external power supply device and a power amount for charging the battery of the electronic device,
         if the transferrable power amount is less than a first threshold, transmit the wireless charging parameter including an information that the control circuit is disable to transmit the power signal to the external electronic device through a radio access technology (RAT), and
         if the transferrable power amount is equal or greater than the first threshold, transmit the power signal to the external electronic device through the coil,
         wherein the transferrable power amount is determined by subtracting the power amount for charging the battery of the electronic device from the power flowing into the electronic device from the external power supply device, and
      in case that the external power device is not connected to the electronic device:
         if an amount of remaining battery is less than a second threshold, transmit the wireless charging parameter including the information that the control circuit is disable to transmit the power signal to the external electronic device through the RAT, and
         if the amount of remaining battery is equal or greater than the second threshold, transmit the power signal to the external electronic device through the coil.

2. The electronic device as claimed in claim 1, wherein the wireless charging parameter comprises at least one of an identifier (ID) of the electronic device, a state related to charging of the electronic device, a providable charging mode, the transferrable power amount, or a transferrable voltage, and
   the wireless charging parameter comprises at least one of information indicating a change in the charging state, information indicating a charging mode to be changed, or information indicating that a charging mode transition is possible.

3. The electronic device as claimed in claim 1, further comprising:
   a connector configured to connect to the external power supply device,
   wherein the control circuit is configured to identify the amount of power flowing into the electronic device from the external power supply device connected using the connector, an amount of power consumed by the electronic device, or a-the power amount for charging the battery of the electronic device and to determine the amount of wireless transmission power further based on the amount of power flowing, the amount of power consumed, or the power charging amount.

4. The electronic device as claimed in claim 3, wherein the amount of power consumed comprises an amount of power consumed for an operation of the electronic device,
   the power charging amount comprises an amount of power used to charge the battery of the electronic device, and
   the amount of power consumed for the operation of the electronic device is determined based on information about at least one application being executed on the electronic device or information about at least one hardware module that is activated.

5. The electronic device as claimed in claim 1, further comprising:
a connector configured to connect to the external power supply device,
wherein the control circuit is configured to identify power supplied from an outside through the connector, to supply at least part of the power supplied from the connector to the wireless power transfer circuit based on the response signal, and to supply at least part of remaining power to the battery.

6. The electronic device as claimed in claim 1, wherein the control circuit is configured to determine the amount of wireless transmission power based on the wireless charging parameter, and
the control circuit is configured to transmit the wireless charging parameter using the coil.

7. The electronic device as claimed in claim 1, wherein the control circuit is configured to identify whether the external electronic device supports a fast charging mode based on a wireless charging parameter received from the external electronic device.

8. The electronic device as claimed in claim 1, wherein the response signal comprises a signal for requesting a change of the amount of wireless transmission power from a first level to a second level from the external electronic device,
the first level is an amount of wireless transmission power supplied in a normal charging mode, and
the second level is an amount of wireless transmission power supplied in a fast charging mode.

9. The electronic device as claimed in claim 1, wherein the charging state comprises at least one of a state related to external power, a state related to internal power consumption, or a heat generation degree due to a charging operation.

10. The electronic device as claimed in claim 1, wherein the control circuit is configured to transmit a ping signal to the external electronic device, to receive a response signal to the ping signal from the external electronic device, and to control the charging circuit to reduce power, a current, or a voltage supplied to the battery before transmitting power to the external electronic device.

11. The electronic device as claimed in claim 1, wherein the response signal comprises a wireless charging parameter of the external electronic device, and
the wireless charging parameter of the external electronic device comprises at least one of a charging-related capability of the external electronic device, a charging-related state of the external electronic device, or an amount of power that the external electronic device can receive.

12. The electronic device as claimed in claim 1, further comprising:
a communication circuit,
wherein the control circuit is configured to transmit the power signal through an antenna, which is different from the coil for transmitting the power signal, using the communication circuit.

13. The electronic device as claimed in claim 1, wherein the control circuit is configured to disable a wireless charging operation by stopping transmission of a ping signal or by comprising information indicating that provision of wireless charging is stopped in the wireless charging parameter when a battery level or the charging state does not satisfy a specified condition.

14. An electronic device comprising:
a connector configured to connect to external power;
a battery;
a charging circuit configured to control a charging state of the battery;
a coil;
a wireless power transfer circuit configured to be electrically connected to the coil; and
a control circuit,
wherein the control circuit is configured to:
in case that an external power is connected to the electronic device:
identify an amount of power flowing into the electronic device from the external power supply device through the connector,
charge the battery with the amount of power flowing into the electronic device from the external power supply device through the connector using the charging circuit,
determine a transferrable power amount based on the amount of power flowing into the electronic device from the external power supply device and a power amount for charging the battery of the electronic device,
wherein the transferrable power amount is determined by subtracting the power amount for charging the battery of the electronic device from the power flowing into the electronic device from the external power supply device,
if the transferrable power amount is equal or greater than the first threshold, transmit a first power signal, which is generated using the wireless power transfer circuit, to the external electronic device through the coils,
identify a state related to charging of the battery,
determine a wireless charging parameter determined at least based on the state related to charging of the battery,
if the transferrable power amount is less than a first threshold, transmit the wireless charging parameter including an information that the control circuit is disable to transmit the first power signal to the external electronic device through a radio access technology (RAT),
receive a response signal corresponding to transmission of the wireless charging parameter from the external electronic device, and
transmit, based on the response signal, a second power signal to the external electronic device using the wireless power transfer circuit, and
in case that the external power device is not connected to the electronic device:
if an amount of remaining battery is less than a second threshold, transmit the wireless charging parameter including the information that the control circuit is disable to transmit the first power signal to the external electronic device through the RAT; and
if the amount of remaining battery is equal or greater than the second threshold, transmit the first power signal to the external electronic device through the coil.

15. An operating method of an electronic device, the method comprising:
identifying a battery level or a charging state;
transmitting a wireless charging parameter related to generation or modification of a power signal to be transmitted to an external electronic device through a coil when the battery level or the charging state satisfies a specified condition;

receiving a response signal to the transmitted wireless charging parameter from the external electronic device;

generating, based on the response signal, a power signal transmitted through the coil, in case that an external power supply device is connected to the electronic device:

identifying an amount of power flowing into the electronic device from the external power supply device, determining a transferrable power amount based on the amount of power flowing into the electronic device from the external power supply device and a power amount for charging the battery of the electronic device, if the transferrable power amount is less than a first threshold, transmitting the wireless charging parameter including an information that the control circuit is disable to transmit the power signal to the external electronic device through a radio access technology (RAT), and if the transferrable power amount is equal or greater than the first threshold, transmitting the power signal to the external electronic device through the coil, wherein the transferrable power amount is determined by subtracting the power amount for charging the battery of the electronic device from the power flowing into the electronic device from the external power supply device, and in case that the external power device is not connected to the electronic device:

if an amount of remaining battery is less than a second threshold, transmitting the wireless charging parameter including the information that the control circuit is disable to transmit the power signal to the external electronic device through the RAT, and if the amount of remaining battery is equal or greater than the second threshold, transmitting the power signal to the external electronic device through the coil.

* * * * *